Feb. 13, 1951 E. U. KUNNAS 2,541,425
CABLE CLAMP
Filed Aug. 19, 1947
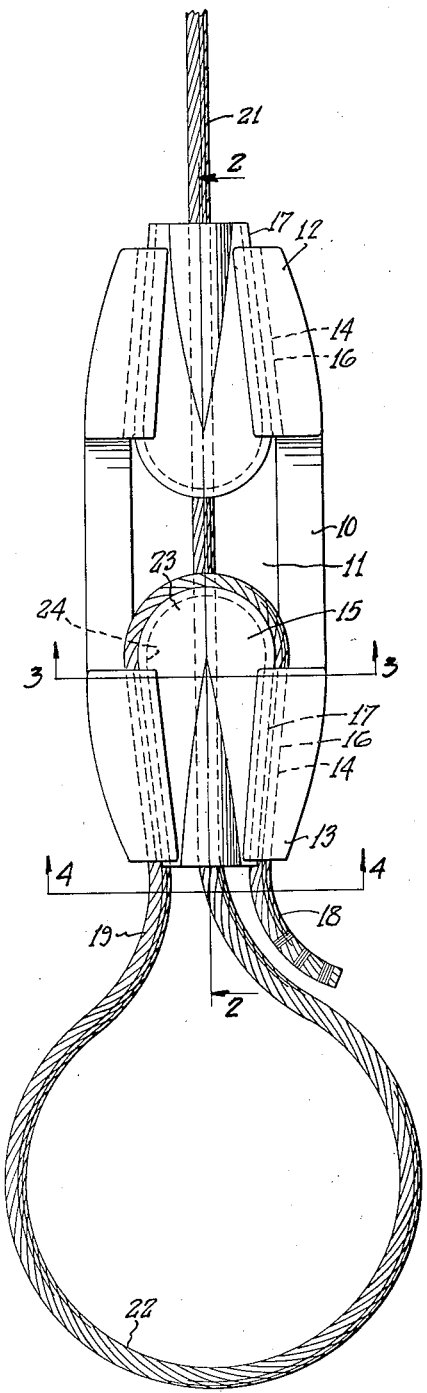
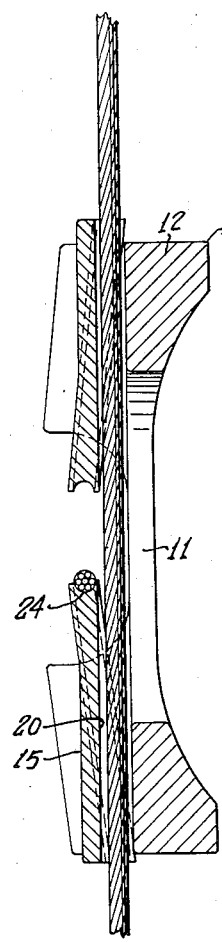
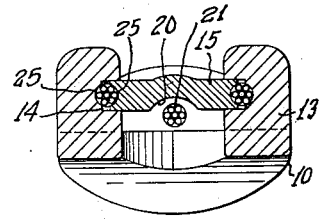
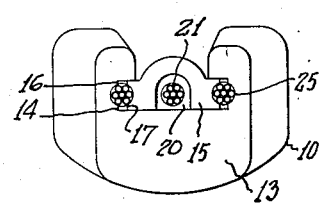
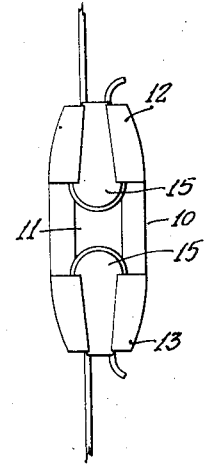
INVENTOR
ELMER U. KUNNAS
BY
ATTORNEY Patented Feb. 13, 1951

2,541,425

UNITED STATES PATENT OFFICE 2,541,425

CABLE CLAMP

Elmer U. Kunnas, Vancouver, Wash.

Application August 19, 1947, Serial No. 769,460

2 Claims. (Cl. 24—136)

This invention relates generally to a device for securing cables and particularly to a cable clamp.

The main object of this invention is to provide a cable clamp whereby two cables may be easily and securely united or a loop may be securely formed in the end of a line without injury to the line, without the use of a special tool or the employment of more than ordinary skill.

I accomplish these and other objects in the manner set forth in the following specifications as illustrated in the accompanying drawing, in which:

Fig. 1 is a side elevation of the device showing same forming a loop on the end of a line.

Fig. 2 is a section taken along line 2—2 in Fig. 1.

Fig. 3 is a transverse section taken along line 3—3 in Fig. 1.

Fig. 4 is a transverse section taken along line 4—4 in Fig. 1.

Fig. 5 is a side elevation of the device joining the ends of two lines.

Similar numbers of reference refer to the same or similar parts throughout the several views.

Referring in detail to the drawing, there is shown a somewhat elongated frame 10 in which is formed a slot 11 and on opposite ends of which are formed the heads 12 and 13 in which are formed tapering slots 14 adapted to receive the wedges 15. The tapering sides 16 of the slots 14 and the tapering sides 17 of the wedges 15 are grooved to receive the line end 18 and the bight 19.

The wedge 15 is provided with a channel 20 through which the line 21 can slide freely when used as shown in Fig. 1, that is, when the loop 22 is drawn tight by hauling on the line 21.

It will be noted that the wedges 15 have rounded ends 23 whose grooves 24 connect with the grooves 25 formed in the adjacent sides 16 and 17 on the members 13 and 15.

It will be noted that the groove 24 is not in parallelism with the axis of the line 21 but makes a dihedral angle with a line passing through the axis as shown in Figs. 2 and 3 to enable the line portions to pass each other.

It can be seen that when used as shown in Fig. 1, one of these wedge members 15 is not used to clamp the line, the work being done by the other member which securely holds the line end 18 and guards against slippage.

In the form of device shown in Fig. 5 where a running portion of the line is not required, both of the wedges 15 are used to hold their respective line ends 26 against slippage with relation to the heads 12.

From the foregoing, it can be seen that the device is not difficult to manufacture or maintain and that it is easily operated and is dependable.

I am aware that numerous forms of cable clamps have been constructed in the past and I, therefore, do not claim such devices broadly but I do intend to cover such forms and modifications thereof as fall fairly within the appended claims.

I claim:

1. A line clamp consisting of an elongated body having tapering grooved recesses formed at opposite ends thereof with the smaller ends of the recesses outermost, a wedge occupying each recess having its large end rounded and grooved said groove forming a dihedral angle with a plane passing through the axis of the clamp and having the edges of the wedges grooved to the point thereof, one side of each wedge having a slot formed along its median longitudinal line in the plane of the recess grooves.

2. A cable clamp consisting of an elongated body having a pair of opposed tapering sockets formed therein, one side of said sockets being open for the reception of a line, the smaller ends of the sockets being outermost, the wider ends of said sockets being spaced from each other, a wedge in each socket having its wide end rounded and bent laterally into the space between the open socket sides, the wedges being slotted on the side contacting the closed side of the body, each of said wedges having a line groove along its sides and rounded end said groove forming a dihedral angle with the plane passing through the line of pull.

ELMER U. KUNNAS.

REFERENCES CITED

The following references are of record in the file of this patent:

UNITED STATES PATENTS

| Number | Name | Date |
|---|---|---|
| 1,058,511 | Wood | Apr. 8, 1913 |
| 1,259,881 | Lehmann | Mar. 19, 1918 |
| 1,955,450 | Blackburn | Apr. 17, 1934 |
| 2,085,333 | Reynolds | June 29, 1937 |
| 2,164,995 | Linman | July 4, 1939 |

FOREIGN PATENTS

| Number | Country | Date |
|---|---|---|
| 438,609 | France | May 23, 1912 |
| 596,257 | France | Aug. 4, 1925 |